May 1, 1951 J. S. NEALE 2,551,455
HELICOPTER
Filed May 15, 1947 3 Sheets-Sheet 1
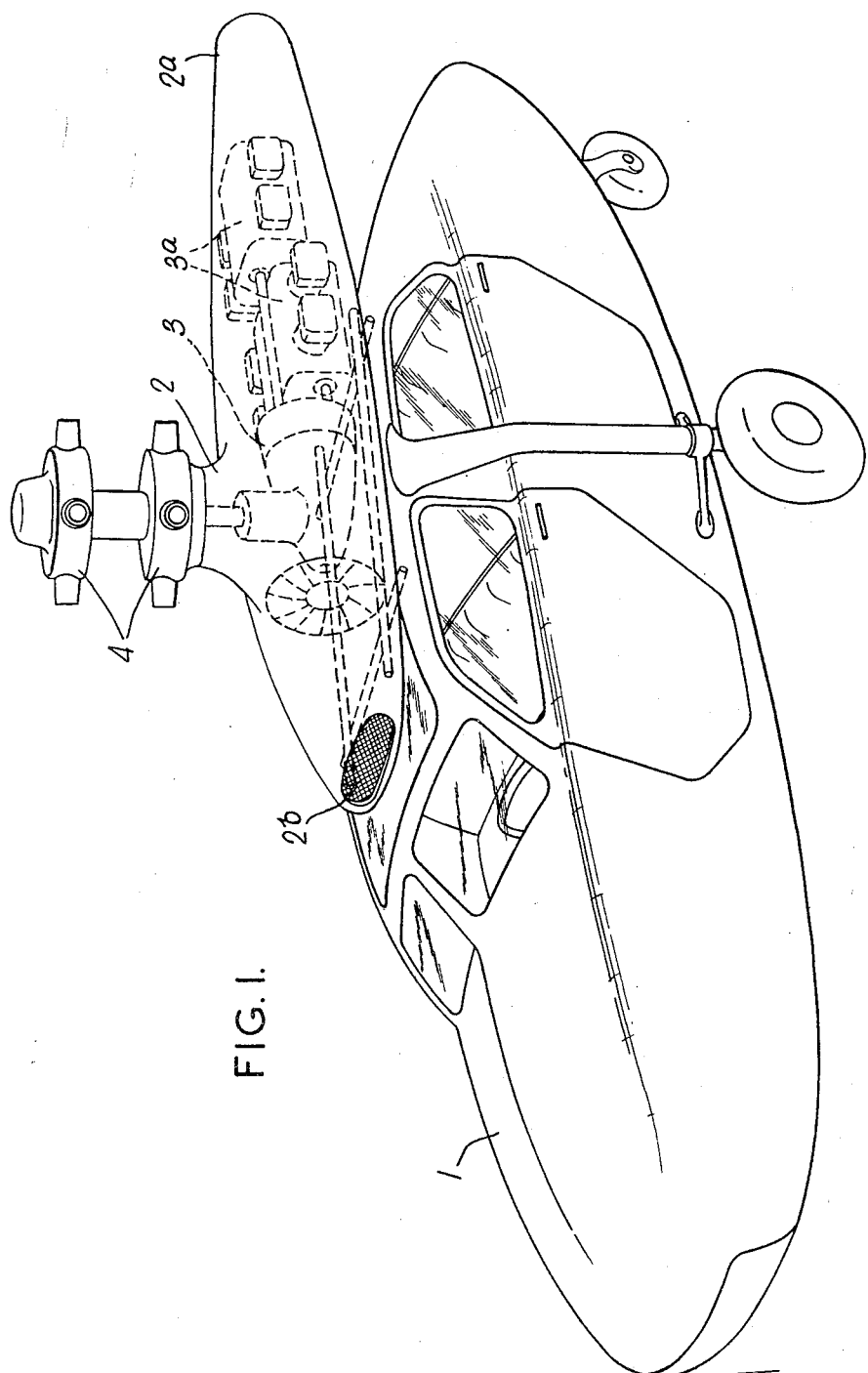
FIG. I.
INVENTOR
JOHN SIDNEY NEALE
By: Hazeltine, Lake & Co.
AGENTS

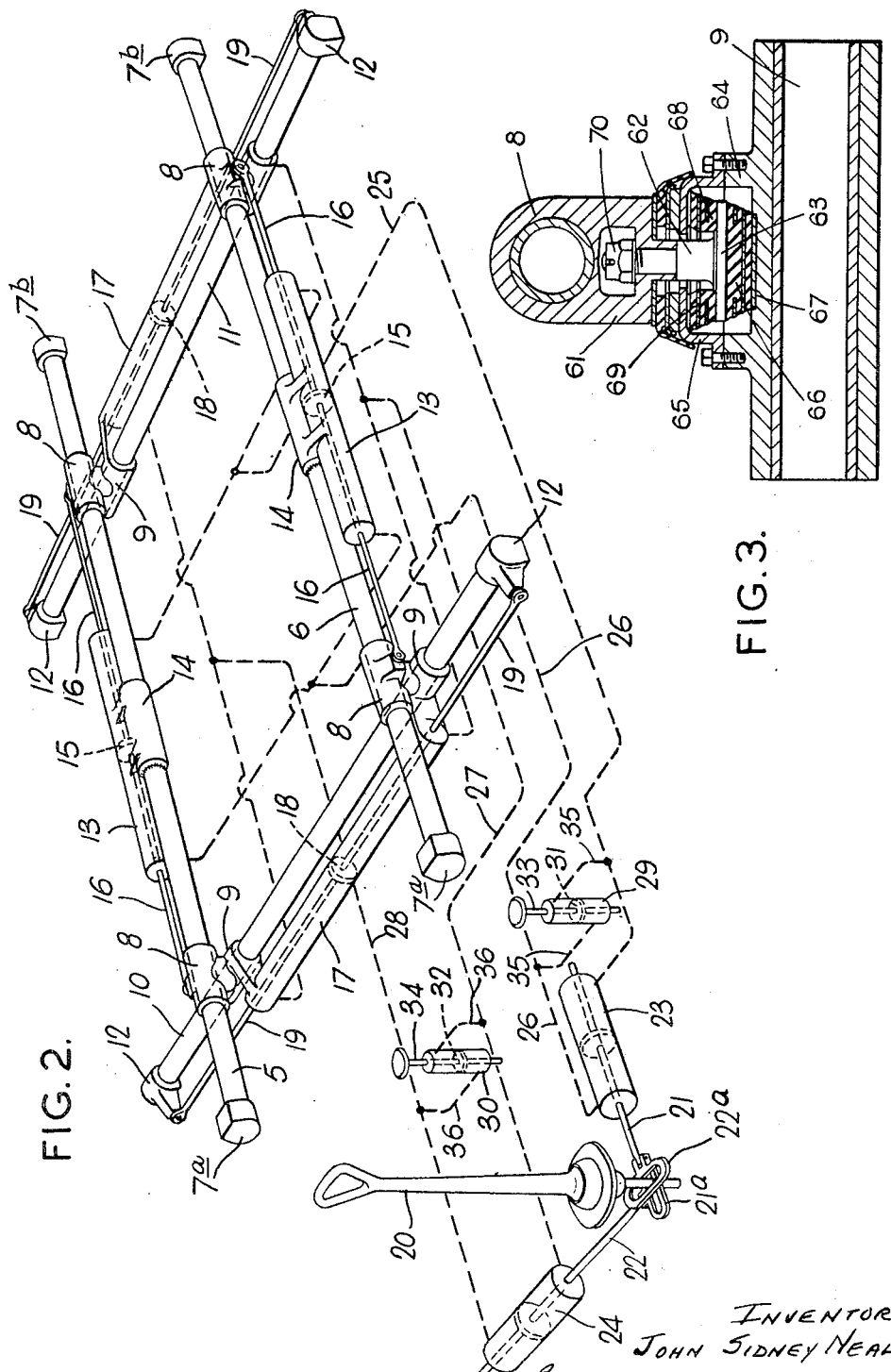

May 1, 1951  J. S. NEALE  2,551,455
HELICOPTER
Filed May 15, 1947  3 Sheets-Sheet 3
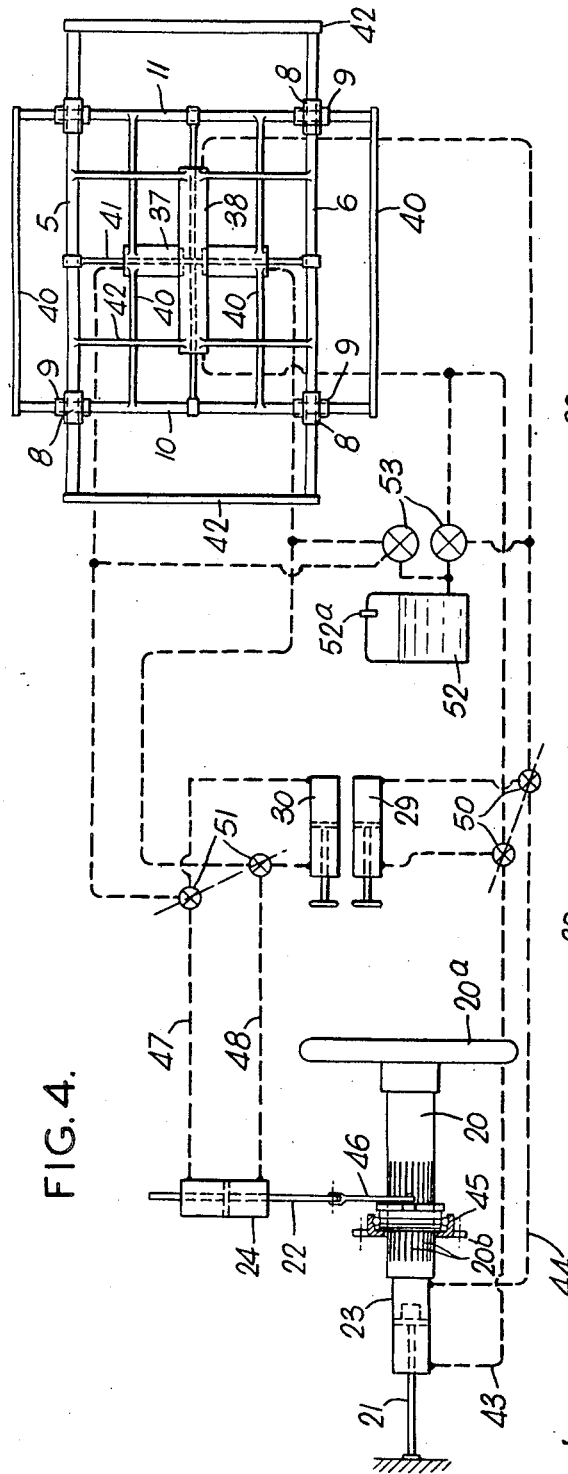
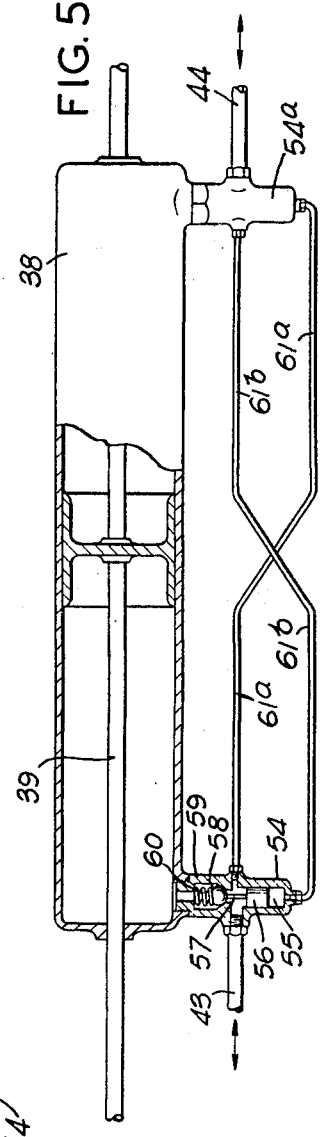
INVENTOR
JOHN SIDNEY NEALE
By:
Haseltine, Lake & Co.
AGENTS Patented May 1, 1951

2,551,455

UNITED STATES PATENT OFFICE 2,551,455

HELICOPTER

John Sidney Neale, Rochdale, England, assignor to Pennine Aircraft Limited, Manchester, England, a company of Great Britain Application May 15, 1947, Serial No. 748,172
In Great Britain August 8, 1946

5 Claims. (Cl. 244—17)

This invention relates to helicopters or rotary wing aircraft. Due to the sensitivity of these machines to changes in the centre of gravity position, considerable difficulties have to be overcome in maintaining the level of the aircraft. This trouble is particularly apparent in machines of the more efficient type, e. g. where the payload is high relatively to the gross weight.

Normally, excessive changes in the position of the centre of gravity of the aircraft relatively to the proper centre of gravity are counteracted by pre-arranging the disposition of the passengers and/or freight, and on occasions the carrying of ballast. There are many objections to such methods, and further, where the payload is high relatively to the gross weight, it is necessary in addition to the foregoing practice to provide for an exceptionally large control range.

It will be appreciated that in helicopters where control is directly or partially due to the tilting of the sustaining rotors, any pronounced displacement of the centre of gravity beyond the normal or symmetrical position will directly affect the control range.

In addition, as is well known, the control problems of helicopters and rotary wing aircraft generally are both extremely complex and difficult, and the extension of control range to assist in the choice of the disposition of passengers and/or freight can present almost insuperable problems.

Likewise, due to difficulties in balancing the sustaining rotors and the complex forces imposed on them, very perceptible vibrations are caused, which vibrations when transmitted to the passengers and freight are a source of discomfort and possibly injury to freight.

The object of the present invention is to obviate the foregoing disadvantages and also to provide for a simplified and very effective means of directional control of the aircraft.

According to this invention a helicopter, or rotary wing machine, is characterised in that the power unit and rotor head with the blades or wings thereon, and the associated transmission driving mechanism are arranged as one unit, and the fuselage containing the control means for manoeuvring the aircraft, comprises another unit means operable from within the fuselage being provided to effect translative adjustment of one unit relatively to the other in the fore and aft and lateral directions.

By providing two units as aforesaid, the means connecting them can embody vibration dampers to obviate engine and rotor head vibrations being transmitted to the passenger seats and/or freight in the fuselage.

In order that the invention may be clearly understood and readily carried into effect, drawings are appended hereto illustrating embodiments thereof, and wherein, Figure 1 is a perspective view showing the normal relationship of the aforesaid two units, Figure 2 is a diagrammatic view showing one form of hydraulic remote control device for effecting fore and aft and lateral translative movement of the fuselage relatively to the power unit and rotor section of the aircraft.

Figure 3 shows a simple form of device for damping vibrations in the connection between the power unit section and the fuselage.

Figure 4 is a diagrammatic view showing an alternative form of hydraulic remote control for effecting fore and aft and lateral translative movement of the fuselage relatively to the power unit section, and, Figure 5 is a sectional side elevation view of one of the cylinders of the hydraulic means employed for driving the fuselage fore and aft or laterally relatively to the power unit sections.

Referring to the drawings, it will be seen by reference to Figure 1 that the fuselage 1 embodying the pilot's and passengers cabin, and/or means for carrying freight and the streamlined housing 2 for the power unit and transmission gear 3 to the rotor head 4, are arranged as separate units in such manner that the fuselage 1 is suspended from the housing 2 when the aircraft is in flight, the connection between these units 1 and 2 being such as to afford a movement of translation of the fuselage 1 relatively to the housing 2 in the fore and aft and lateral direction. By this means, any disposal of the load carried by the fuselage in such manner as to shift the position of the centre of gravity from the normal can be readily compensated for by actual displacement of one unit relatively to the other. This displacement may be effected when the aircraft is on the ground, in which event of course the housing 2 will be displaced relatively to the stationary fuselage 1, whereas during flight the fuselage 1 will be displaced relatively to the upper unit comprising the housing 2 with the engine and rotor head carrying the contra-rotating blades or wings.

The means for effecting the aforesaid relative displacement of the fuselage 1 and housing 2 can embody any suitable mechanism, such as, e. g. remote controlled hydraulic gear, or a cable and link connection from a prime mover such as a control column to the relatively displaceable parts appropriate to the fuselage 1 and housing 2, it being understood that it is immaterial what form of remote control gear is employed for this purpose so long as it is adaptable to the requirements in question. With a hydraulic remote control device, any of the well-known follow-up or repeater mechanisms operated hydraulically can be employed together with suitable means for correcting for lag in the transmission, and in the drawings I have shown the hydraulic remote control means purposely in the simplest form to avoid unnecessary complications in the drawings.

In the latter connection the arrangement shown in Figure 2 employs two parallel fore and aft tubes 5 and 6 which act as slideways and carry at their front ends brackets 7a for attachment to brackets of the transmission gear 3 in the frame work of the housing 2, and in addition at their rear the tubes 5 and 6 carry engine brackets 7b for attachment to a bulkhead or other suitable element for the support of the power unit or unit 3a preferably accommodated in the elongated rear part 2a of the housing 2, if desired the front end of the rearward extension 2a can be concentrically spaced from the trailing end of the housing 2 to afford an annular air inlet whereby a simple form of supercharger or induced air draught or pressure can be employed for supporting combustion, and/or for cooling the engine. However the result can be obtained by providing an air intake 2b at the nose of the housing 2.

Slidable along the tubes 5 and 6 are four, Phosphor bronze lined or other suitable antifriction collars or sleeves 8, preferably provided with suitable lubricating or greasing means, such collars having fixed thereto, and immediately beneath them, like sleeves 9 with their axes disposed at right angles to the axes of the sleeves 8, these sleeves 9 receiving slidably a pair of transverse tubes 10 and 11 provided at their ends with brackets 12 fixed to upper frame members of the fuselage 1, whereby the fuselage can be adjusted translatively laterally both to port and starboard relatively to the engine carrying tubes 5 and 6, the sleeves 8 enabling the transverse tubes 10 and 11, and consequently the fuselage 1, to be likewise adjusted in the fore and aft direction. It will be appreciated that, by this means of connection between the housing 2 and the fuselage 1, there is provided within a limited range an infinitely variable radius of adjustment of the fuselage in a plane transverse to the vertical relatively to the unit constituted by the housing 2 and the elements carried thereby.

Fore and aft adjustment of the fuselage is effected by remote control of the feed of hydraulic fluid to a longitudinal pair of cylinders 13 fixed by collars 14 to the tubes 5 and 6, the pistons 15 within these cylinders having their rods 16 carried through both ends of the cylinders and connected at their outer terminals to the brackets 8 aforesaid.

The lateral sliding movement of the fuselage relatively to the housing 2 is effected by the remote control of hydraulic fluid to a pair of cylinders 17 fixed at their ends to the sleeves 9, the pistons 18 in the cylinders 17 having their rods 19 passed through both ends of the cylinders and secured at their ends to the fuselage mounting brackets 12.

All of the cylinders 13 and 17 are completely charged with oil opposite sides of the pistons, and the ends of these cylinders are connected to remote control means by conduits, which in common with the cylinders are maintained fully charged with oil, for which purpose any suitable recuperator or pressure feed oil supply source can be employed.

Fore and aft movements are applied to the fuselage relatively to the housing 2 by corresponding adjustments of the manually operated control lever 20 conveniently accessible to the pilot, the lower end of the control column 20 being connected to the piston rods 21 and 22 of a pair of hydraulic rams 23 and 24 comprising respectively the control rams for fore and aft adjustment and lateral adjustment of the fuselage relatively to the housing 2. The connection of the control lever 20 to the piston rods 21 and 22 can follow any suitable known mechanism, and as is shown purely diagrammatically by way of example as comprising transversely and longitudinally slotted heads (21a and 22a not shown) respectively on the rods 21 and 22, these slotted heads conveniently sliding one upon the other and being as close as possible to the axis of articulation of the lever 20.

The diameter of the cylinders 13 and 17 is appreciably smaller than that of the cylinders 23 and 24 in order that for a small movement of the pistons within the cylinders 23 and 24 a relatively much longer movement is applied to the pistons 15 and 18.

A closed circuit is provided for the conduiting connecting the cylinders 23 and 24 to the cylinders 13 and 17 rear end of the fore and aft control ram 23 being connected by a pipe line 25 to the rear ends of both of the cylinders 13, the front end of the ram cylinder 23 being connected by a pipe line 26 to the front ends of both of these cylinders 13.

Likewise, one end of the ram cylinder 24 is connected to one end of both of the cylinders 17 by a pipe line 27, and the other end of the ram cylinder 24 is connected by a pipe line 28 to the other ends of both of the cylinders 17.

By this means fore and aft movement of the control column 20 will effect fore and aft displacement of the sleeves 8, and consequently of the brackets 12 and fuselage 1 relatively to the housing 2. Likewise, lateral movements of the control column 20 will cause a displacement of hydraulic fluid such as to drive the pistons 18 in the appropriate lateral direction, and these will carry with them rods or tubes 10 and 11 with the consequent lateral displacement of the fuselage relatively to the housing 2.

In order to trim the fuselage relatively to the housing 2 when flying, or to trim the housing 2 relatively to the fuselage when on the ground longitudinal and lateral trimming devices are provided, each such device comprising a ram cylinder 29 appropriate to longitudinal trimming, and a ram cylinder 30 appropriate to lateral trimming. Pistons 31 and 32 in these cylinders are adjusted by screw feed piston rods 33 and 34 respectively, and the ends of the cylinders 30 and 29 are connected by branch pipes 35 and 36 respectively to the pipe lines 25, 26, 27 and 28. By locking the control column 20 in the central position and adjusting the positions of the pistons 31 and 32 in the trimming cylinders, the fuselage and the housing 2 can be adjusted one relatively to the other, whereby, if desired, the aircraft may be trimmed on the ground for an approximate or correct adjustment to compensate for any displacement of the load which alters the position of centre of gravity of the aircraft.

Instead of employing two pairs of cylinders 15 and 17, a single transverse cylinder 37 and longitudinal cylinder 38 can be employed, as shown in Figure 4, the piston rod 39 slidable through the ends of the cylinder 38 being connected at its ends to the transverse tubes 10 and 11 which can carry longitudinal struts 40 to rigidly connect these tubes 10 and 11 and afford additional means for connecting such tubes to the fuselage frame work.

The piston rod 41 passing through both ends of the transverse cylinder 37 is connected at its ends to the longitudinal tubes 5 and 6, which likewise can be strutted by transverse tubular members 42 acting as engine bearers or additional means for securing the longitudinal tubes 5 and 6 to the housing 2 and engine mounting. In this arrangement the ram 23 is moved translatively along its axis by the axial displacement of the control column 20 in the fore and aft direction, so that the ram 23 slides relatively to the piston rod 21 which is suitably fixed to a convenient part of the fuselage frame, the ends of the ram cylinder being connected by conduits 43 and 44 to the front end and rear ends respectively of the longitudinal cylinder 38. Lateral movements are imparted to the tubular members 5 and 6 relatively to the tubular members 10 and 11 by turning the control column 20 about its axis by a hand wheel 20a, the control column being splined by longitudinal grooves 20b through a collar 45 which in practice will have its periphery journalled in a bearing ring fixed relatively to the fuselage frame, the collar 45 carrying a crank 45a connected by a link 46 to the piston rod 22 of the ram cylinder 24. The ends of the cylinder 24 are connected by conduits 47 and 48 to the ends of the transverse cylinder 37.

When it is desired to trim the fuselage 1 relatively to the housing 2 or vice versa, the cylinders 23 and 24 are isolated from the control circuit by actuation of control valves arranged as a pair 50 in the conduits 43 and 44 and a pair 51 in the conduits 47 and 48, the arrangement being such that when the valves 50 are simultaneously adjusted in one position, the cylinder 29 is in operative connection with the cylinder 38 and the cylinder 23 is isolated from the circuit. Likewise, when the valves 51 are set in appropriate position the cylinder 30 is in communication with the cylinder 37 and the cylinder 24 is isolated from the circuit.

Any suitable means may be provided for maintaining a complete charge of oil under pressure in the circuit, and purely for the purpose of illustration a reservoir 52 is shown connected via non-return valves 53 to the pipe line 43, 44, 47 and 48, the reservoir being subjected to internal pressure by feeding compressed air therein via a non-return valve controlled inlet 52a from any suitable source of supply, the reservoir 52 having provided with its outlet, or the conduit leading from the outlet, any suitable de-aerating means.

It is desirable in this supply of oil to, and delivery of oil from, the cylinders 13 and 17 or 37 and 38, to ensure that only impulses from the controls can give a movement to the slide-ways or tubes which are otherwise locked against displacement so that if the machine is tilted there is no uncontrolled displacement of the housing 2 relatively to the fuselage or vice-versa. For this purpose the ends of the cylinder are provided with a pair of valve housings 54 and 54a each having a depending cylinder 55 in which slides a plunger 56 having an upstanding stem 57 engaging a ball-valve 58 urged downwardly against a conical seating in an upper valve chamber 59 by a coiled compression spring 60. Assuming that the cylinder in question is the cylinder 38, the pipe line 43 communicates with the valve housing 54 and the pipe line 44 communicates with the valve housing 54a. The lower end of the valve housing 54 communicates by a pipe 61b with the space within the valve housing 54a between the valve 58 and plunger 56 at the other end of the cylinder. Likewise, the lower end of the valve housing 54a communicates by a pipe 61a with the like space within the valve housing 54. For example, if oil under pressure is being fed to the cylinder along the pipe line 43, the ball-valve 58 in the housing 54a receiving the pipe line 44 which is to act as a discharge pipe line, can only be raised by the effect of the oil pressure upon the plunger 56 in the housing 54a when there is a sufficient charge and pressure of oil in the driving end of the cylinder to react with the oil in the pipe line 43 and the pipe 61 connecting the valve housing 54 to the valve housing 54a. By this means, taken in conjunction with the pressure generating means 52, there is always in effect a solid connection between the ram cylinders 23 and 24 and the cylinders 13 and 17 or 37 and 38.

By mounting the power unit and rotor head in a housing separate from the fuselage, it is possible to introduce means to damp down the vibrations of the rotor head and engine so that such vibrations do not affect the fuselage, and for this purpose damping means is incorporated in the connections between the sleeve 8 and 9, a suitable damping means similar to that shown in patent specification No. 2,382,373 being shown in Figure 3, from which it will be seen that the sleeve 8 is formed with an integral depending hollow boss 61 fitted on to a shank 62 extending from a core disc 63 which is arranged between housing members 64 and 65, a resilient element 66 being bonded to the core member 63 and also to a plate 67 centered in the housing member 64. A resilient member 68 is bonded to the core and is centered in the housing member 65. Reinforcing plates 69 are provided in the resilient members. The housing member 64 is secured to the sleeve 9, and a nut 70 is threaded on to the shank 62 to secure the boss 61 to the shank. It will be appreciated from this arrangement that the connection between the sleeves 8 and 9 is of a resilient nature adapted to absorb vibrations from the power unit.

It will be understood that where necessary the control lines or conduits will include flexible parts to accommodate the relative displacement of the housing 2 and fuselage 1 as well as the displacements of the longitudinal and transverse rods or tubes.

I claim:

1. In a helicopter or rotary wing type of aircraft a fuselage, a power unit, a housing accommodating the power unit, a rotor driven by the power unit and supported by and above the housing, means connecting the housing and fuselage so that during flight the fuselage is suspended from the housing, longitudinal and transverse guides, longitudinal and transverse frame members sliding in said guides, means connecting some of said members to the housing and the other to the fuselage so that relative translative fore-and-aft and lateral displacements can be produced between the housing and the fuselage, means in the fuselage to restrict said relatively slidable members against relative movement and embodying hydraulic remote control operated means for effecting displacement of said relatively movable parts in such a manner that displacement of the fuselage relatively to the said housing, can be effected both in the fore and aft direction and transversely, and means associated with said hydraulic means to effect a trimming of the fuselage relatively to the engine and rotor carrying housing to enable the position of the centre of gravity of the complete aircraft to be adjusted and fixed independently of the remote control means for adjusting the position of the fuselage relatively to the said unit embodying the engine and rotor.

2. A helicopter according to claim 1 wherein said longitudinal and transverse frame members are arranged as a parallel longitudinal pair and a parallel transverse pair disposed at right angles to the longitudinal pair so as to form a rectangular assembly of frame members, a number of pairs of sleeves comprising said guides, the two pairs of frame members being inter-connected at each of their four intersecting points by a pair of said sleeves, each pair of sleeves being arranged with one sleeve in the longitudinal direction to slidably receive a longitudinal frame member, and the other sleeve in the transverse direction to slidably receive a transverse frame member, each such pair of sleeves being connected together to form a unitary assembly by a central connecting device, damping means being incorporated in said central connecting device arranged to absorb the vibration of the engine and rotor head.

3. A helicopter according to claim 2 wherein the longitudinal frame members and the transversely arranged sleeves carrying the transverse frame members are secured to the said means restricting the relative sliding movement of the frame members, said means comprising longitudinal and transverse cylinders to which the said longitudinal members and transverse sleeves are respectively secured, the cylinders containing pistons, the piston rods of which extend through both ends of the cylinders, the cylinders secured to the longitudinal frame members having their piston rods connected to the longitudinally arranged sleeves and conduits connecting the ends of the cylinders to remote control means operable from a controller member adapted to be actuated manually.

4. A helicopter or rotary wing type of aircraft according to claim 3 wherein the cylinders associated with the longitudinal and transverse frame members are each provided with valve means located at the ends of the appropriate cylinder arranged to close the cylinder against discharge of liquid therefrom until a driving impulse is fed into the cylinder from the remote control means.

5. A helicopter or rotary wing type of aircraft according to claim 4 wherein said valve means comprises at each end of each cylinder an external valve housing accommodating a non-return spring loaded valve controlling the flow of hydraulic fluid into and from the end of the cylinder on which it is mounted, each valve housing being connected to the valve housing at the opposite end of the same cylinder by a conduit communicating with a chamber in the last mentioned valve housing in which slides a plunger adapted to receive hydraulic fluid pressure from the source of pressure supply to raise the spring loaded valve to open one end of the cylinder to discharge when the other cylinder is being charged with hydraulic fluid under pressure.

JOHN SIDNEY NEALE.

REFERENCES CITED

The following references are of record in the file of this patent:

UNITED STATES PATENTS

| Number | Name | Date |
| --- | --- | --- |
| 1,491,310 | Perrin | Apr. 22, 1924 |
| 2,156,334 | Bothezat | May 2, 1939 |
| 2,185,277 | Stelzer | Jan. 2, 1940 |
| 2,382,373 | Lord | Aug. 14, 1945 |
| 2,395,143 | Prewitt | Feb. 19, 1946 |
| 2,410,978 | Kelly | Nov. 12, 1946 |
| 2,477,501 | Tyler | July 26, 1949 |